(12) United States Patent
Miyamoto et al.

(10) Patent No.: US 8,879,189 B2
(45) Date of Patent: Nov. 4, 2014

(54) MAGNETIC HEAD SLIDER HAVING SHARED HEATER AND CONTACT SENSOR TERMINAL PADS

(75) Inventors: Norifumi Miyamoto, Chigasaki (JP); Satoshi Tabata, Chigasaki (JP); Akira Morinaga, Chigasaki (JP); Masahiro Ito, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 162 days.

(21) Appl. No.: 13/358,367

(22) Filed: Jan. 25, 2012

(65) Prior Publication Data

US 2013/0188273 A1 Jul. 25, 2013

(51) Int. Cl.
*G11B 21/12* (2006.01)
*G11B 5/48* (2006.01)

(52) U.S. Cl.
USPC .......................................... 360/55; 360/294.7

(58) Field of Classification Search
CPC ............................. G11B 5/607; G11B 5/6076
See application file for complete search history.

(56) References Cited

U.S. PATENT DOCUMENTS

| 7,088,543 | B2  |     | 8/2006  | Satoh et al.    |         |
|-----------|-----|-----|---------|-----------------|---------|
| 7,133,254 | B2  |     | 11/2006 | Hamann et al.   |         |
| 7,400,473 | B1  | *   | 7/2008  | Krajnovich et al. | 360/294.7 |
| 7,551,406 | B1  | *   | 6/2009  | Thomas et al.   | 360/317 |
| 7,589,928 | B2  |     | 9/2009  | Roy et al.      |         |
| 7,821,744 | B2  |     | 10/2010 | Takahashi et al. |        |
| 7,929,256 | B2  |     | 4/2011  | Yamashita et al. |        |
| 2007/0230056 | A1 |    | 10/2007 | Beach et al.    |         |
| 2008/0225426 | A1 | *  | 9/2008  | Roy et al.      | 360/31  |
| 2009/0251828 | A1 |    | 10/2009 | Schreck et al.  |         |
| 2010/0123966 | A1 | *  | 5/2010  | Antoku et al.   | 360/59  |
| 2010/0149696 | A1 |    | 6/2010  | Chen et al.     |         |
| 2010/0157477 | A1 |    | 6/2010  | Morinaga et al. |         |
| 2010/0182723 | A1 |    | 7/2010  | Yanagisawa      |         |
| 2011/0149430 | A1 | *  | 6/2011  | Shiramatsu et al. | 360/75 |
| 2012/0002319 | A1 | *  | 1/2012  | Kondo           | 360/59  |
| 2013/0083430 | A1 | *  | 4/2013  | Chiu et al.     | 360/234.3 |
| 2013/0094107 | A1 | *  | 4/2013  | Setiadi et al.  | 360/234.3 |

FOREIGN PATENT DOCUMENTS

JP 2011/034628 A 2/2011
JP 2011/065719 A 3/2011

* cited by examiner

*Primary Examiner* — Wayne Young
*Assistant Examiner* — Mark Fischer
(74) *Attorney, Agent, or Firm* — Zilka-Kotab, PC

(57) ABSTRACT

In one embodiment, a magnetic head slider includes at least one magnetic head element chosen from a group consisting of: a write element adapted for writing data to a magnetic recording medium and a read element adapted for reading data from the magnetic recording medium, a heater element adapted for controlling a flying height of the at least one magnetic head element above the magnetic recording medium, a contact sensor element adapted for detecting contact between the magnetic head slider near the at least one magnetic head element and the magnetic recording medium, and shared terminals adapted for supplying voltage to the heater element and for conveying signals from the contact sensor element. Other magnetic head sliders and methods of use are described according to additional embodiments.

20 Claims, 8 Drawing Sheets

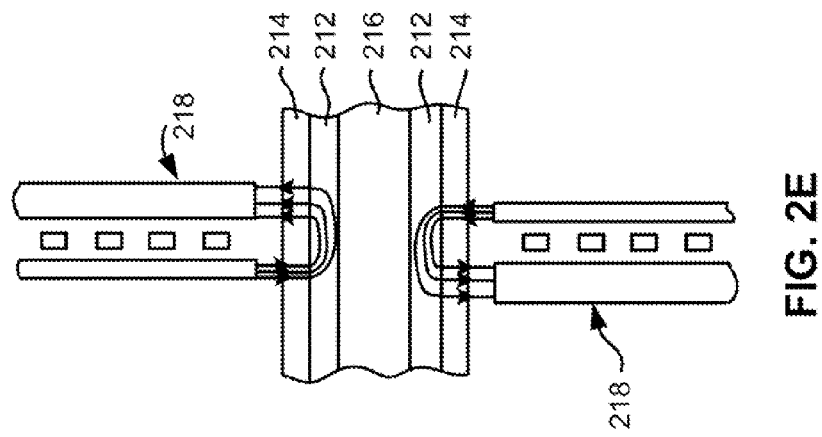
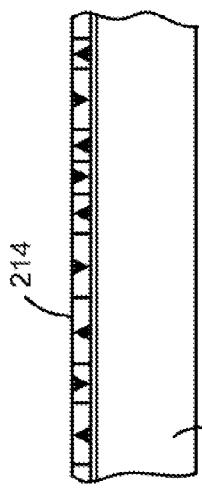
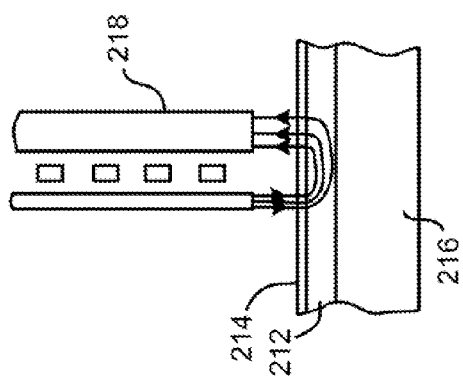
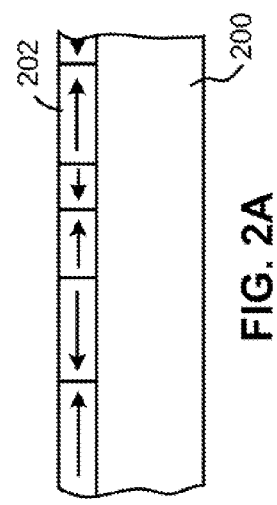
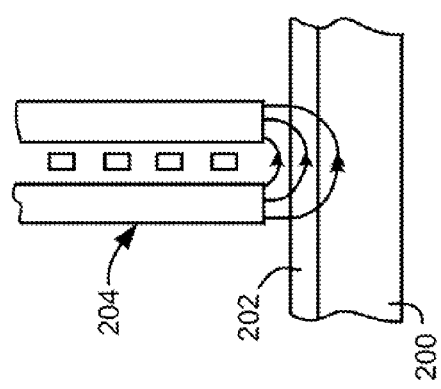

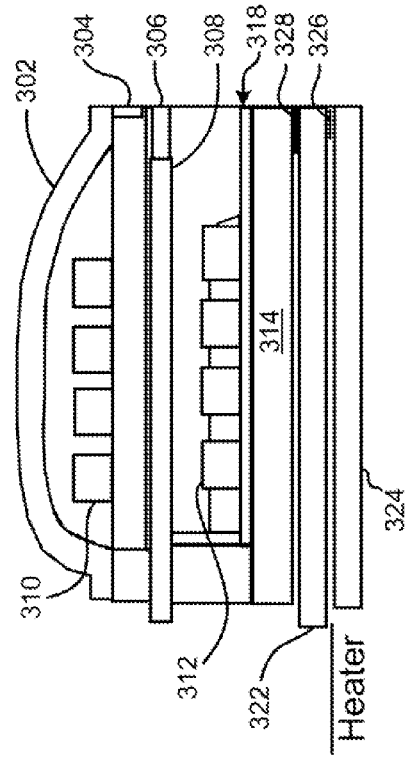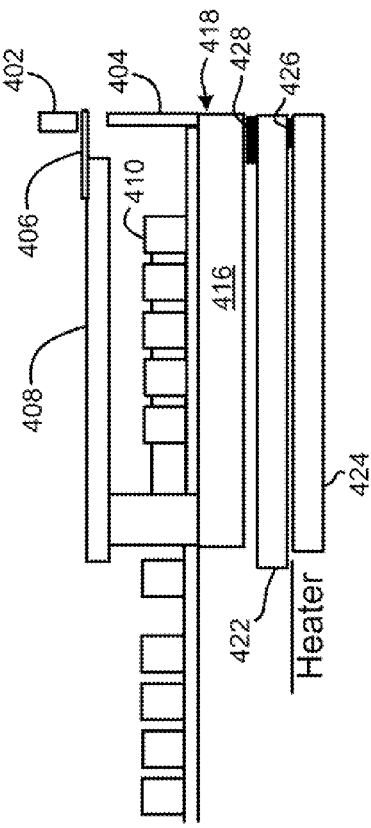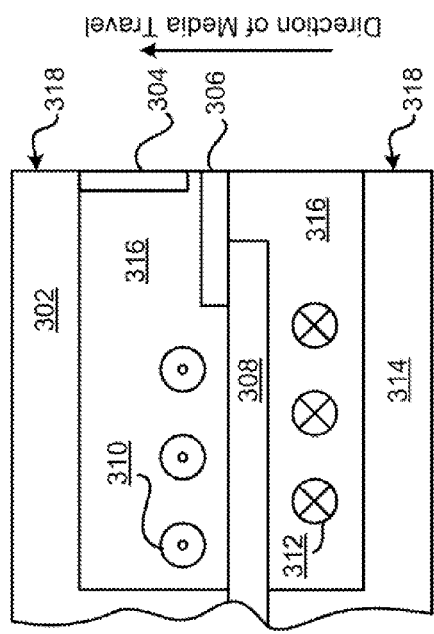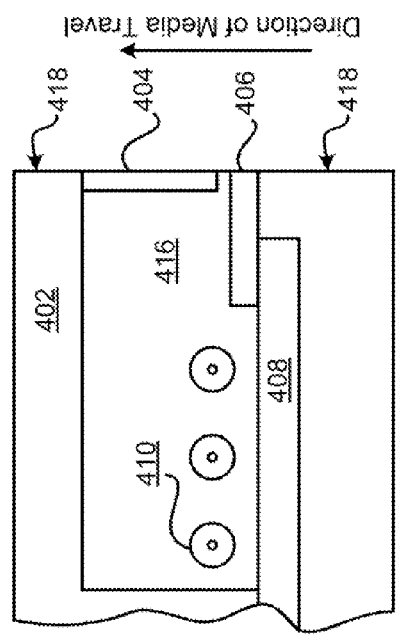

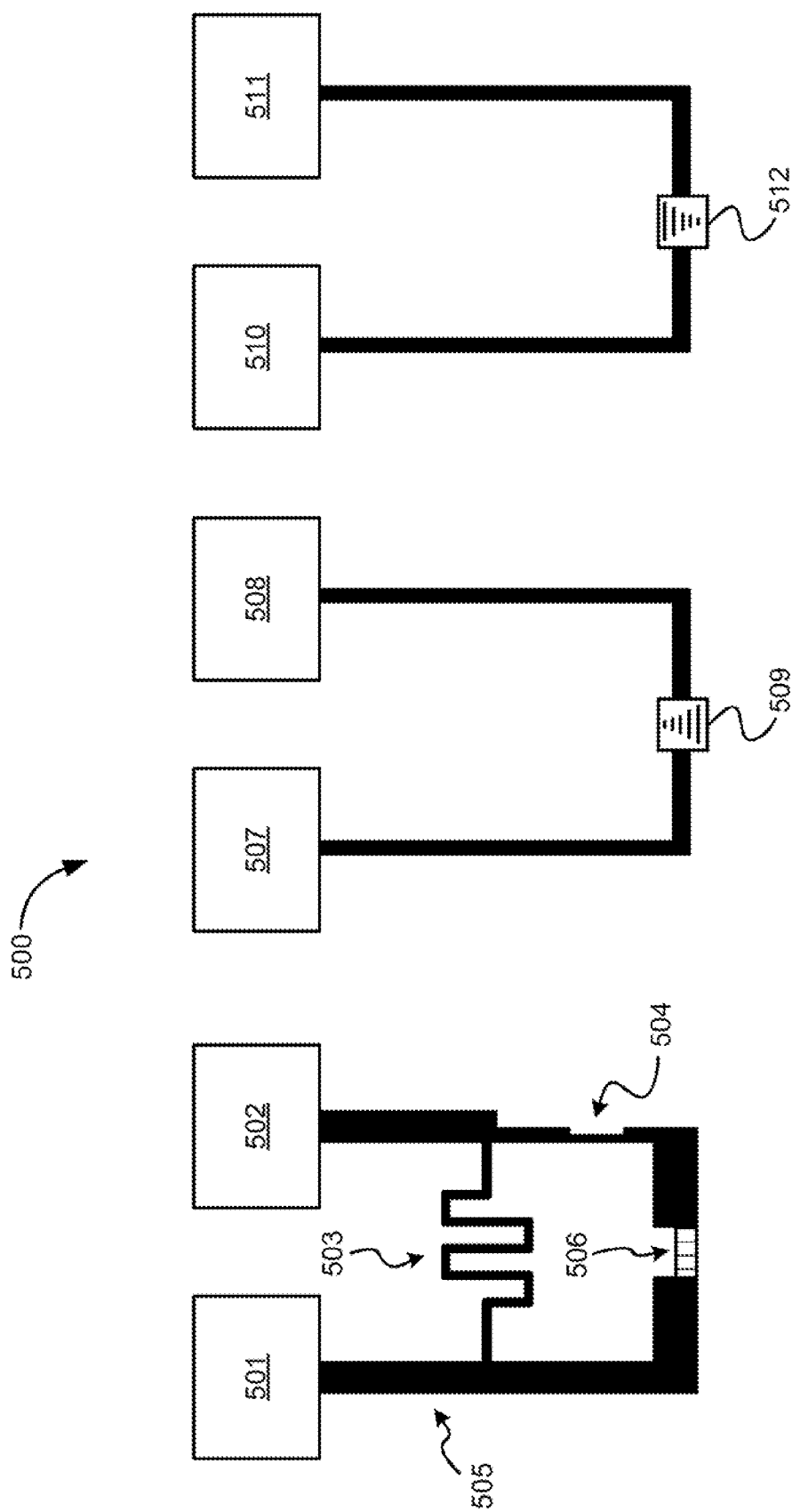

MAGNETIC HEAD SLIDER HAVING SHARED HEATER AND CONTACT SENSOR TERMINAL PADS

FIELD OF THE INVENTION

The present application relates to magnetic head slider structures, and more particularly to magnetic head sliders having shared heater and contact sensor terminal pads.

BACKGROUND

Magnetic disk devices perform magnetic recording in a contact less manner by rotating a magnetic disk at high speed and maintaining the spacing of a magnetic head slider and the magnetic disk with an air film therebetween. In order to record information at high density, it is useful to reduce the spacing of the rotating magnetic disk and the magnetic head slider (referred to as a "flying height"). In current magnetic disk devices, minimum flying height of the magnetic head slider is around 10 nm or less. A magnetic head for recording/reproducing signals is formed on the magnetic head slider using a thin film process, typically. Recent magnetic head sliders may also comprise a built-in heater element for controlling the clearance between the magnetic head and the magnetic disk in the vicinity of the elements of the magnetic head to a high degree of accuracy, and a built-in contact sensor element for detecting contact with the magnetic disk. Combined use of these elements has the function of allowing only the vicinity of the magnetic head near the elements to come safely in proximity to the magnetic disk.

Some magnetic heads comprise only two heads, namely a recording head for recording signals and a reproduction head for reproducing the recorded signals. A system in which a heater element for reducing the spacing of the magnetic head and the magnetic disk is embedded to allow only the vicinity of the magnetic head element to protrude safely is implemented in only some magnetic heads recently. More current heads may also have a built-in contact sensor element for detecting contact with the magnetic disk, in order to minimize the spacing with the magnetic disk. As a result, magnetic heads started out with a total of four terminals being formed on the magnetic head slider, two for elements for the recording head and two for elements for the reproduction head, but current magnetic head sliders have an additional four terminals for the heater elements and contact sensor elements, making a total of eight terminals installed on the magnetic head slider.

The idea of embedding a plurality of heater elements and embedding a plurality of contact sensor elements has also been investigated in order to control the spacing of the magnetic head and the magnetic disk with a high degree of accuracy, so the number of terminals on the magnetic head slider is steadily increasing.

The magnetic head slider is attached to a support component referred to as suspension and the terminals are electrically connected to the suspension using a conductive material such as solder. The increased number of terminals on the magnetic head slider inevitably reduces the terminal area required for connection, and there is reduced quality at the connected sections and a greater amount of work involved in the solder attachment operation, and this causes a reduction in the work yield. Furthermore, increased numbers of terminals lead to an increase in the area of the elements, and the number of magnetic heads per wafer is also reduced and/or limited. This therefore is also a problem from the point of view of production costs.

U.S. Pat. No. 7,589,928 discloses an example of reducing the number of terminals by providing shared terminals for the heater element and the contact sensor element. This example proposes the idea of connecting the heater element and the contact sensor element in parallel or in series to the terminals so that the terminals of the two elements are shared. A passive element is utilized to separate signals in the parallel-connection idea. Specifically, an inductor (coil) is inserted in series with the heater element and a capacitor is inserted in series with the contact sensor element, and use is made of the fact that the signals used by each have a different frequency band.

However, the addition of a new capacitor element and inductance element occupies area on the wafer and the increased degree of integration becomes a problem. If a plurality of heater elements and contact sensor elements are subsequently installed with the aim of controlling the spacing more accurately, it is difficult to further increase the degree of integration. With the series-connection idea, on the other hand, it is difficult to control the respective amounts of current for the heater element, which is intended to provide heating, and the contact sensor element, which is intended to detect signals, and this example only discloses that the two elements are endowed with a layered stricture, and the specific element configuration is not disclosed.

SUMMARY

In one general embodiment, a magnetic head slider includes at least one magnetic head element chosen from a group consisting of: a write element adapted for writing data to a magnetic recording medium and a read element adapted for reading data from the magnetic recording medium, a heater element adapted for controlling a flying height of the at least one magnetic head element above the magnetic recording medium, a contact sensor element adapted for detecting contact between the magnetic head slider near the at least one magnetic head element and the magnetic recording medium, and shared terminals adapted for supplying voltage to the heater element and for conveying signals from the contact sensor element.

In another general embodiment, a magnetic head slider includes at least one magnetic head element chosen from a group consisting of: a write element adapted for writing data to a magnetic recording medium and a read element adapted for reading data from the magnetic recording medium, a plurality of heater elements, each heater element adapted for controlling a flying height of one magnetic head element above the magnetic recording medium, a plurality of contact sensor elements, each contact sensor element adapted for detecting contact between the magnetic head slider near one magnetic head element and the magnetic recording medium, a plurality of terminals adapted for supplying voltage to the plurality of heater elements and for conveying signals from the plurality of contact sensor elements, each terminal being connected to a pair of elements: one of the plurality of heater elements and one of the plurality of contact sensor elements, and a plurality of resistive elements, each resistive element adapted for regulating current to one of the plurality of contact sensor elements and positioned in series with the contact sensor element.

In yet another general embodiment, a method includes supplying voltage to a heater element of a magnetic head slider through a pair of terminals of the magnetic head slider, and conveying signals from a contact sensor element of the magnetic head slider through one of the terminals to a device, wherein the contact sensor element and the heater element are coupled to the pair of terminals.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and magnetic recording medium combination for longitudinal magnetic recording as in FIG. 2A.

FIG. 2C is a magnetic recording medium utilizing a perpendicular magnetic recording format.

FIG. 2D is a schematic representation of a magnetic head and magnetic recording medium combination for perpendicular magnetic recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5 illustrates a partial view of a magnetic head slider having shared heater and contact sensor terminal pads, according to one embodiment.

DETAILED DESCRIPTION

Figure 1:
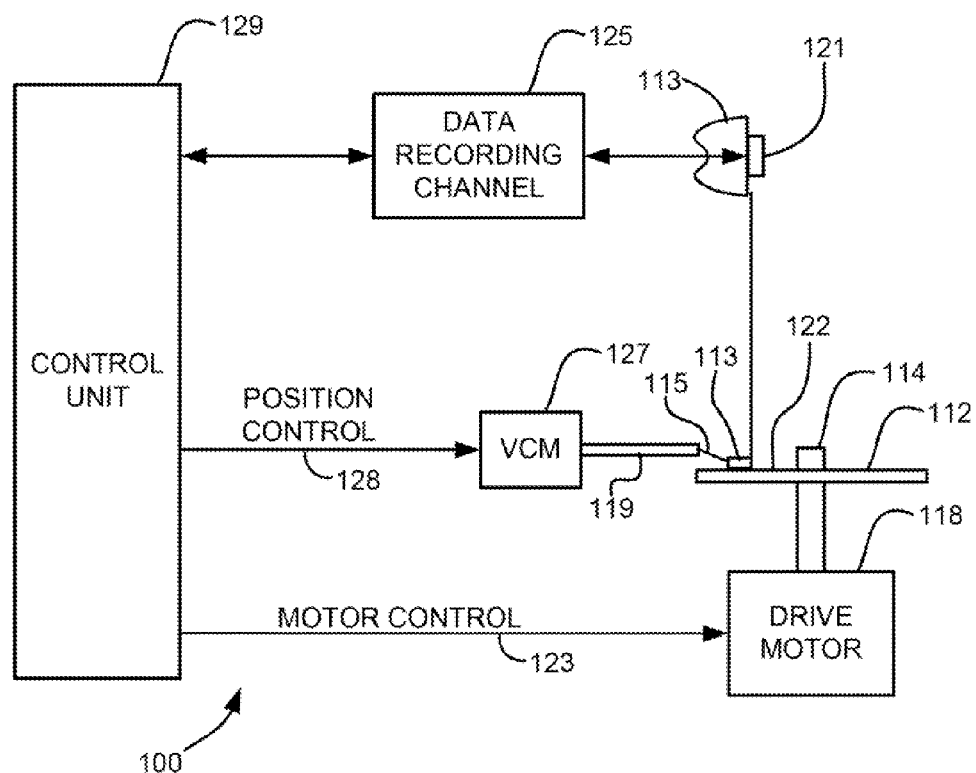
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head slider includes at least one magnetic head element chosen from a group consisting of: a write element adapted for writing data to a magnetic recording medium and a read element adapted for reading data from the magnetic recording medium, a heater element adapted for controlling a flying height of the at least one magnetic head element above the magnetic recording medium, a contact sensor element adapted for detecting contact between the magnetic head slider near the at least one magnetic head element and the magnetic recording medium, and shared terminals adapted for supplying voltage to the heater element and for conveying signals from the contact sensor element.

In another general embodiment, a magnetic head slider includes at least one magnetic head element chosen from a group consisting of: a write element adapted for writing data to a magnetic recording medium and a read element adapted for reading data from the magnetic recording medium, a plurality of heater elements, each heater element adapted for controlling a flying height of one magnetic head element above the magnetic recording medium, a plurality of contact sensor elements, each contact sensor element adapted for detecting contact between the magnetic head slider near one magnetic head element and the magnetic recording medium, a plurality of terminals adapted for supplying voltage to the plurality of heater elements and for conveying signals from the plurality of contact sensor elements, each terminal being connected to a pair of elements: one of the plurality of heater elements and one of the plurality of contact sensor elements, and a plurality of resistive elements, each resistive element adapted for regulating current to one of the plurality of contact sensor elements and positioned in series with the contact sensor element.

In yet another general embodiment, a method includes supplying voltage to a heater element of a magnetic head slider through a pair of terminals of the magnetic head slider, and conveying signals from a contact sensor element of the magnetic head slider through one of the terminals to a device, wherein the contact sensor element and the heater element are coupled to the pair of terminals.

Referring now to FIG. 1, there is shown a magnetic recording disk drive 100 in accordance with one embodiment of the present invention: As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the magnetic disk drive system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the magnetic disk drive system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk drive system, and the accompanying illustration of FIG. 1 is for representation purposes only. It should be apparent that magnetic disk drive systems may contain a large number of disks and actuators, and each actuator may support a number of sliders.

In one embodiment, a magnetic disk drive system 100 may comprise at least one magnetic head 121 as described herein according to any embodiment, a magnetic recording medium 112, a drive mechanism 118 for passing the magnetic recording medium 112 over the at least one magnetic head 121, and a controller 129 electrically coupled to the at least one magnetic head 112 for controlling operation of the at least one magnetic head 112.

An interface may also be provided for communication between the disk drive and a host (integral or external) to send and receive the data and for controlling the operation of the disk drive and communicating the status of the disk drive to the host, all as will be understood by those of skill in the art.

In a typical magnetic head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic recording medium.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the magnetic recording medium.

According to one illustrative embodiment, a magnetic disk drive system may comprise at least one magnetic head as described herein according to any embodiment, a magnetic recording medium, a drive mechanism for passing the magnetic recording medium over the at least one magnetic head, and a controller electrically coupled to the at least one magnetic head for controlling operation of the at least one magnetic head.

FIG. 2A illustrates, schematically, a conventional magnetic recording medium such as used with magnetic disk drive systems, such as that shown in FIG. 1. This medium is utilized for recording magnetic impulses in or parallel to the plane of the medium itself. The magnetic recording medium, a recording disk in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional magnetic recording medium, such as that of FIG. 2A.

FIG. 2C illustrates, schematically, the orientation of magnetic impulses substantially perpendicular to the surface of a magnetic recording medium as used with magnetic disk drive systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a magnetic recording medium. The magnetic recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the magnetic recording medium with the high permeability under layer 212 of the medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable magnetic heads 218 positioned adjacent the outer surface of the magnetic coating 214 on each side of the medium, allowing for recording on each side of the medium.

FIG. 3A is a cross-sectional view of a perpendicular head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, reading sensor shields 422, 424 are shown. The reading sensor 426 is typically positioned between the sensor shields 422, 424.

In FIGS. 3B and 4B, an optional heater (Heater) is shown near the non-ABS side of the magnetic head and an optional contact sensor 328, FIG. 3B; 428, FIG. 4B is shown near the ABS side of the magnetic head. A heater element (Heater) and/or a contact sensor element 328, FIG. 3B; 428, FIG. 4B may also be included in the magnetic heads shown in FIGS. 3A and 4A, according to some embodiments. The position of the heater may vary based on design parameters such as where the protrusion is desired, coefficients of thermal expansion of the surrounding layers, etc. The contact sensor may be located near the ABS side of the magnetic head to detect contact with a disk.

Now referring to FIG. 5, a partial view of a magnetic head slider 500 is shown according to one embodiment. From this view, a configuration is shown including positions of a heater element 503 and a contact sensor element 506.

The magnetic head slider 500, according to one embodiment, comprises at least one magnetic head element, such as a write element 509 and a read element 512 which are adapted for recording data to a magnetic recording medium and reading data from the medium, respectively; a heater element 503 adapted for controlling an amount of protrusion of portions of the magnetic head (and thus control a spacing of the magnetic head slider 500 above the medium); and a contact sensor element 506 adapted for detecting contact between the magnetic head slider 500 near the at least one magnetic head element and the magnetic recording medium.

In one embodiment, application of voltage to the heater element 503 may be controlled using commands from a magnetic recording disk drive system and DC voltage may be repeatedly turned on/off at a prescribed period in sector units. The on/off control period is a minimum of several hundred microseconds, and the frequency band thereof is no more than several kHz at the most. To provide a little more detail, in one embodiment, when the actual magnetic recording disk drive is not carrying out reading or writing operations, the voltage to the heater element 503 is completely off.

Furthermore, during reading and/or writing operations, respective prescribed voltages are applied. The applied voltage for reading is generally higher than the applied voltage for writing, but does not need be. This is because the temperature of the magnetic head element body during writing is higher than during reading because of the passage of the writing current, so there is a large heating effect associated therewith. Meanwhile, the contact sensor element 506 detects contact between the magnetic head element (whether it is a writing element 509 or reading element 512) and the magnetic recording medium by utilizing the increase in resistance caused by the heat generated by the resistive element 504 due to contact energy (positive signal), or, conversely, a decrease in the resistance when the contact sensor element 506 which generates heat comes into contact with the magnetic medium (negative signal).

Alternatively, according to one theory and not limiting on the invention in any manner, the contact may cause cooling, which decreases the resistance value. The relative speed of the magnetic head and magnetic disk is very high at several tens of meters/second, and when there is an impact with the minute projections, the pulse resistance value changes. The pulse is often less than several tens of microseconds, and the frequency band is several tens of kHz or more. This means that the bands used by the two elements may be separated, so it is entirely possible to split the frequency bands using a mechanism provided on the preamp side.

In one embodiment, the heater element 503 may have a time constant of several tens of microseconds to a hundred microseconds, and the voltage may be controlled from an external circuit in recording sector time units. In this instance, the applied voltage signal band is several kHz at the most. The contact sensor element 506 may be adapted for detecting when a vicinity of the magnetic head element expands, protrudes, and approaches the magnetic medium due to the heat generated by the heater element 506. Generally, innumerable minute projections are present on the surface of the magnetic recording medium, and when these projections come into contact with the contact sensor element 506, there is a resistance change in the pulse signal. This change is detected, and the extent of contact is quantified by counting the pulse number. This takes place at very high speed and involves impacts with minute projections, so the pulse signal band is generally several tens of kHz or higher. Two terminals may be shared by two or more heater elements 503 and/or contact sensor elements 506, according to various embodiments. As shown in FIG. 5, terminals 501, 502 of the heater element 503 and the contact sensor element 506 may be shared. In one approach, the signals of the heater element 503 and the contact sensor element 506 may be separated using a circuit, by utilizing the abovementioned difference in the signal bands of the two elements. As a result, the number of terminals on the magnetic head slider 500 may be reduced from eight, which is typical for conventional magnetic head sliders, to six in the embodiment shown in FIG. 5, according to one embodiment.

In another embodiment, a current regulating pattern may be provided in part of the connection 505 (which may be an electrode, wire, lead, etc.), such as by a resistive element 504, to the contact sensor element 506 in order to control the bias current to the contact sensor element 506. For example, a resistive element 504 adapted for regulating current may be positioned in series with the contact sensor element 506. This resistive element 504 may be coupled to the circuit at a point after the heater element 503 branches from the terminal 502, as shown in FIG. 5, such that it is adapted to regulate current to the contact sensor element 506.

In one approach, the contact sensor element 506 may be coupled to a device via the two terminals 501, 502. The device may be any type of device as would be known to one of skill in the art, such as a controller, a data repository, a magnetic head, etc.

According to one embodiment, the heater element 503 and the contact sensor element 506 may be coupled in parallel across the two terminals 501, 502. Of course, any other circuit design may be used as would be known to one of skill in the art which would allow control of the heater element 503 and the contact sensor element 506 individually.

In another embodiment, second terminals may be coupled to the at least one magnetic head element. For example, as shown in FIG. 5, second terminals 507, 508 may be coupled to write element 509, while second terminals 510, 511 are coupled to read element 512. Of course, multiple read elements 512 and/or multiple write elements 509 may be included in the magnetic head slider 500, along with associated terminals, according to various embodiments.

In another embodiment, referring now to FIGS. 1 and 5, a magnetic data storage system, such as disk drive 100, may comprise at least one magnetic head slider as described in regards to FIG. 5, such as slider 113, a magnetic recording medium such as disk 112, a drive mechanism such as drive mechanism 118 for passing the disk 112 over the at least one magnetic head slider 113, and a controller such as controller 129 electrically coupled to the at least one magnetic head slider 113 for controlling operation of the at least one magnetic head slider 113.

In this embodiment, a voltage application circuit adapted for applying a voltage to the at least one magnetic head slider may be present for providing voltage to the heater element and a contact circuit adapted for amplifying a signal from a contact sensor element of the at least one magnetic head slider and detecting contact with the magnetic recording medium may be present. The circuit may be coupled through a signal filter to a common terminal of the at least one magnetic head slider with the voltage application circuit.

In a further embodiment, the contact circuit may include an oscillator circuit adapted for applying an alternating current (AC) signal to the contact sensor element to cause resonance with the contact sensor element and detecting a change in resonant frequency or an amplitude fluctuation at a resonance point to detect contact with the magnetic recording medium.

Figure 6:
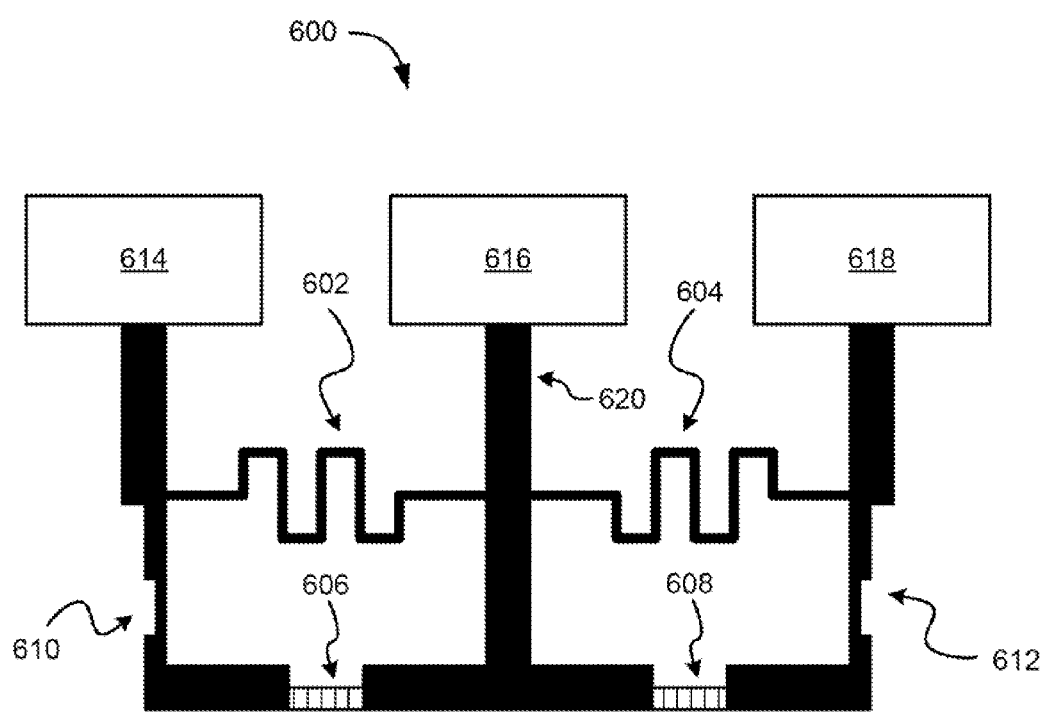
FIG. 6 illustrates a partial view of a magnetic head slider having shared heater and contact sensor terminal pads that are connected in parallel and have a common terminal, according to one embodiment.

According to another embodiment, as shown in FIG. 6, two heater elements 602, 604 may share a ground 620, while two contact sensor elements 606, 608, also share the ground 620. In this embodiment, a current regulating pattern 610, 612 may be positioned in series with the two contact sensor elements 606, 608, with the three terminals 614, 616, 618 of the heater elements 602, 604 and the three terminals 614, 616, 618 of the contact sensor elements 606, 608 also being shared. Control and signal detection for the two heater elements 602, 604 and the contact sensor elements 606, 608 may be performed using these three terminals 614, 616, 618. Three or more elements may be configured in this manner, according to various embodiments.

As will be appreciated by one skilled in the art upon reading the present descriptions, FIG. 6 may be viewed as one possible variant of the exemplary embodiment shown in FIG. 5. In such embodiments, embedding heater elements and embedding contact sensors at two or more locations enables more accurate control of magnetic head slider flying height.

One exemplary embodiment shown in FIG. 6 where two heater elements and/or two contact sensor elements are embedded in a magnetic head slider is one of many possibilities, as would be understood by one of skill in the art upon reading the present descriptions. Two heater elements 602 and 604 may be connected to the shared terminals, in some embodiments. Notably, the terminals on the opposite side may be connected to terminal 614 and terminal 618, respectively. The two heater elements may be independently controlled by providing a shared ground terminal 616. Meanwhile, the two contact sensor elements 606 and 608 are also connected to the shared terminal 616, and the terminals on the opposite side may be connected to terminal 614 and terminal 618, respectively. In the same way as in the exemplary embodiment shown in FIG. 5, the heater elements and the contact sensor elements may be connected in parallel, and the current to the contact sensor elements may be restricted by the resistive elements 610 and 612, respectively, in one approach.

Additionally, the resistance value of the contact sensor element and the current restricting resistive element may be estimated with a material having high feasibility. This estimation has the following provisos. (1) The power required by a current normal heater element may be in a range from about 50 mW to 200 mW, in some embodiments. (2) The power applied to the contact sensor element may be about 1 mW. The power is preferably no greater than about 1 mW in order to prevent the sensor element itself from generating heat, and moreover to prevent a reduction in the reliability of the element itself. The applied power of current products is about 0.1 mW, which may be used according to some embodiments. (3) The maximum power that may be supplied by the magnetic recording disk drive is about 5 V, in one approach.

Particularly in view of proviso (3), referring again to FIG. 5, the upper limit for the resistance of the heater element may be first set to about 125 Ω. When the maximum power of 200 mW is then applied to the heater element 503, the series combined resistance of the resistances from the contact sensor 506 and the current restricting resistive element 504 is set to approximately 25 kΩ in order to ensure that approximately 1 mW flows to the contact sensor element.

The feasibility of a combined resistance of approximately 25 kΩ of the contact sensor element was investigated as follows, in one exemplary embodiment. The element resistance R may be calculated as $R = \rho \times L/A$ (ρ: electrical resistivity, L: total sensor length, A: sensor cross-sectional area). When using titanium, which has a relatively high electrical resistivity (e.g., an electrical resistivity of about 430 nΩm), in a metallic body used in the thin film process for producing a magnetic head slider, the resistance is about 21.5 kΩ for a sensor film thickness of about 10 nm, sensor width of about 50 nm, and sensor length of about 25 nm, which was a desirable resistance. However, the sensor width of about 25 nm is large, and therefore actual application favors the use of a material having higher electrical resistivity, or a mechanism for accommodating the sensor inside the magnetic head, in some embodiments.

In more embodiments, other prospective metallic bodies that may be utilized include nickel (Ni, 70 nΩm), iron (Fe, 100 nΩm), and other suitable materials as would be known in the art. Compared with titanium, the electrical resistivity of these other prospective metallic bodies is lower, but it is known from experimentation that the electrical resistivity thereof increases when the bodies are arranged as a thin film, so these materials are suitable when thusly arranged.

Furthermore, the contact sensor portion may be accommodated in the region of the heater element so that the resistance value of the sensor element increases because of the heat produced by the heater element. Accordingly, the power to the sensor may be restricted, and a self-compensation function is produced, which is favorable in various embodiments as disclosed in the present descriptions.

Figure 7:
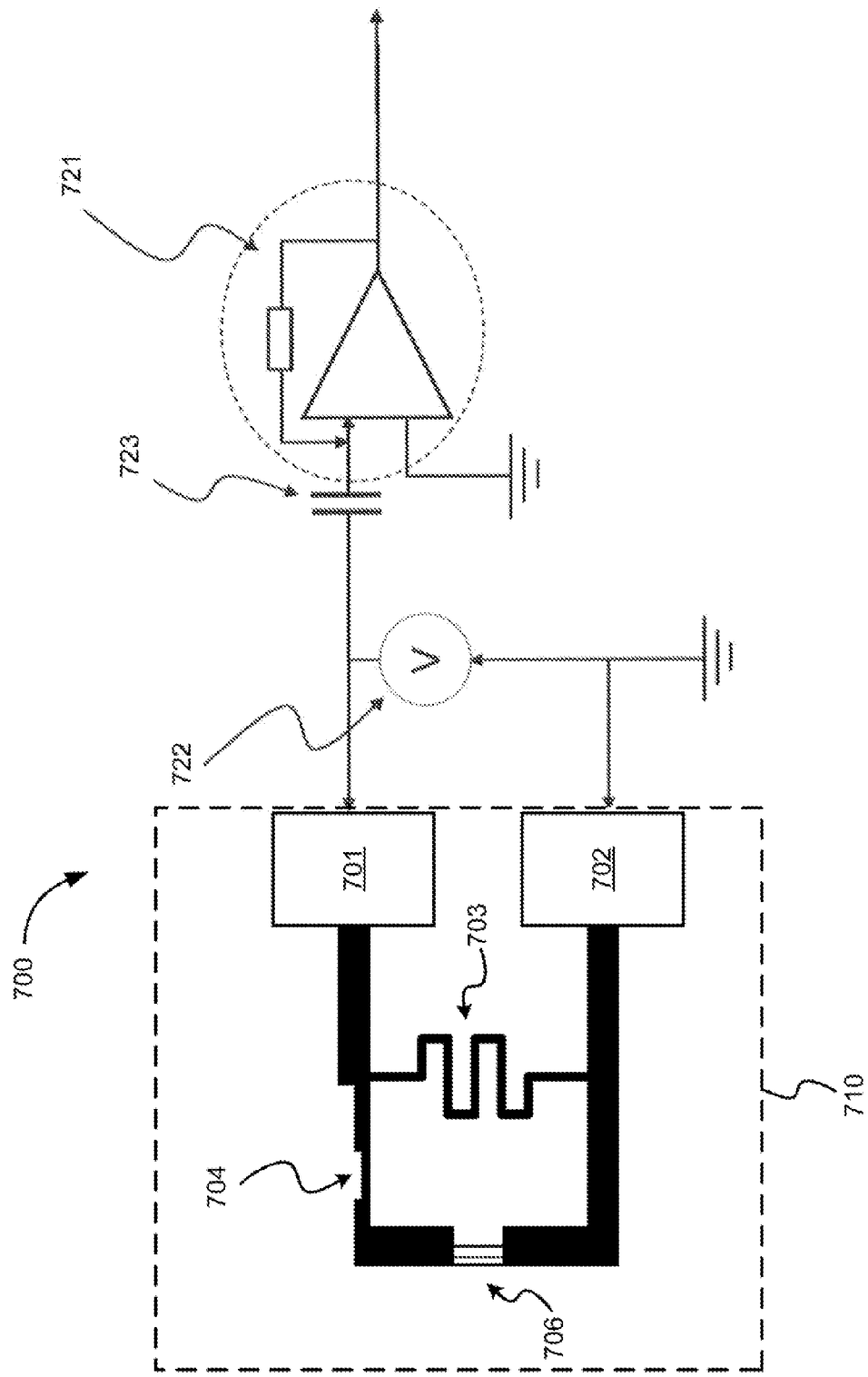
FIG. 7 illustrates a partial view of a magnetic head slider having shared heater and contact sensor terminal pads which is connected to a detection circuit, according to one embodiment.

Referring now to FIG. 7, one exemplary embodiment of a circuit 700 used to split frequency bands is shown. Component 710 represents a component having a heater element 703 and a contact sensor element 706 with shared terminals 701, 702, according to one embodiment. The configuration of this component 710 is the same or substantially similar to that shown in FIG. 5.

Referring again to FIG. 7, in some embodiments, voltage may be applied to the shared terminals 701, 702, for example from a DC voltage source 722. In an actual magnetic recording disk drive, the voltage may be repeatedly controlled in sector units of the magnetic disk and voltage of a prescribed magnitude may be applied at a prescribed timing to the heater element 703, although this is not shown in the figure. Of course, other schemes may be used as would be known to one of skill in the art. Meanwhile, the voltage may be applied to the contact sensor element 706 via the resistive element 704 for restricting the current which passes, and control is carried out so that a prescribed current flows, in one approach.

In a further approach, when the magnetic disk and the magnetic head come into contact, the resistance value of the contact sensor element 706 changes. Moreover, in some instances the cooling action is intensified in proximity to the surface of the magnetic disk and the resistance value decreases accordingly. Further still, there are other instances where heat may be generated by a sudden burst of energy generated from impact with projections on the surface of the magnetic disk and the resistance value accordingly increases during such events.

As a result, in some approaches, direct current applied to the heater element 703 may be subject to changes and the frequency band thereof is correspondingly low. On the other hand, pulsating resistance changes may be produced by the contact sensor element 706, and the frequency band thereof may be correspondingly wide.

In the exemplary embodiment shown in FIG. 7, pulsating resistance value changes may be used to detect contact between the magnetic disk and the magnetic head using a circuit 700. According to this approach, an amplifier 721 may be connected to a terminal 701 via a coupling capacitor 723 which may be positioned in the circuit in order to cut the DC component, in one approach. As shown in FIG. 7, the terminal 702 may be connected to a ground. The pulse resistance value change detected by the contact sensor element 706 may be sent to the amplifier 721 via the capacitor 723 as a voltage change, and subsequently sent to a circuit, such as a pulse count circuit, in some embodiments, where the degree of contact may be quantified. The capacitor 723 is selected so as to have a capacitor constant which is optimized to fit the pulse band being detected.

Figure 8:
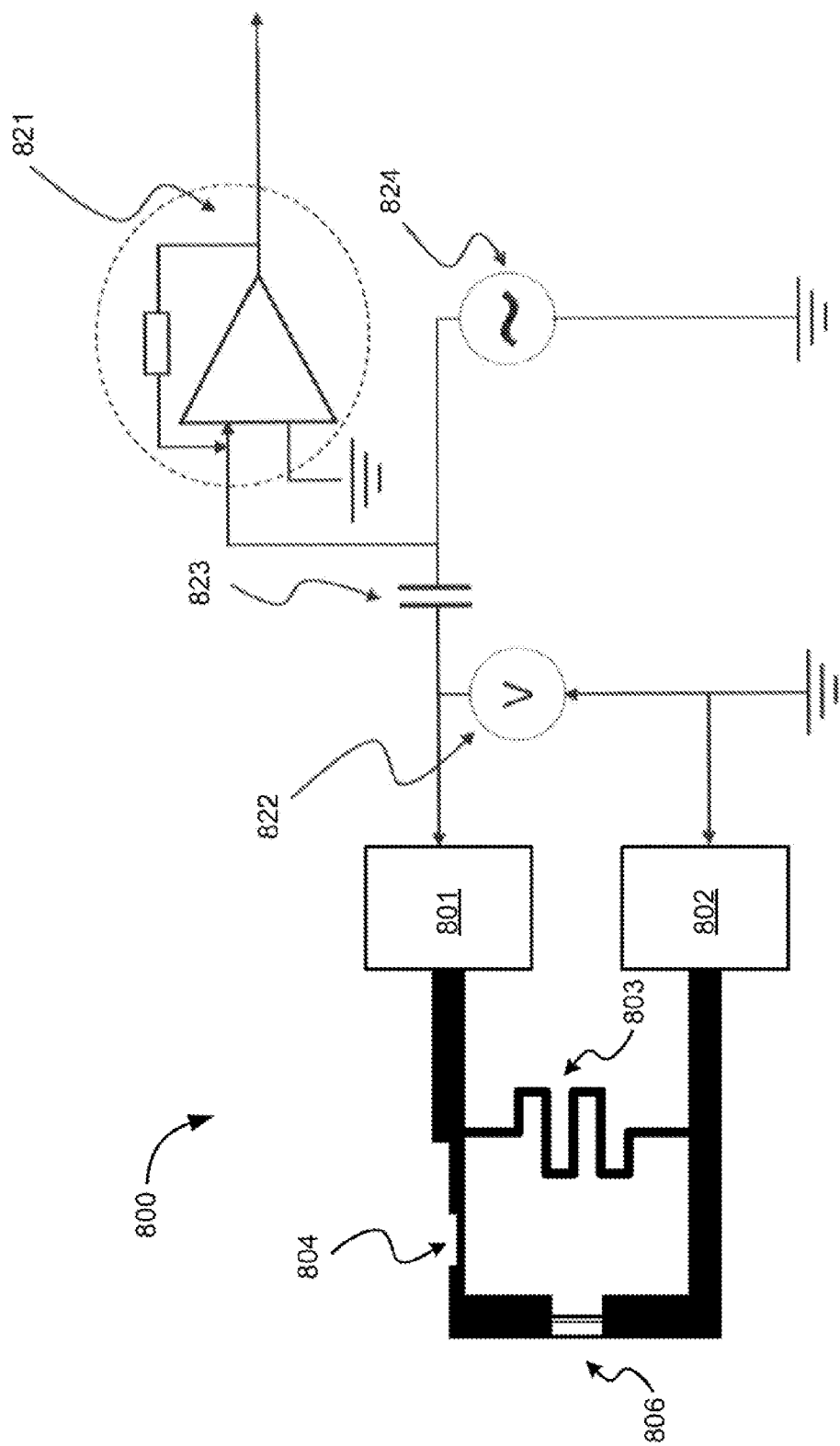
FIG. 8 illustrates a partial view of a magnetic head slider having shared heater and contact sensor terminal pads which is connected to a variable-frequency oscillator circuit, according to one embodiment.

FIG. 8 shows an exemplary embodiment of a circuit 800 where contact is detected by utilizing a change in impedance of a variable-frequency oscillator circuit 824 and the contact sensor element 806. That is, at the moment when the magnetic disk and the magnetic head make contact, the resistance value of the contact sensor 806 fluctuates and the resonant frequency fluctuates, which is detected by the variable-frequency oscillator circuit 824. The degree of contact is quantified by capturing this fluctuation in resonant frequency. The other components are similar to those shown in FIG. 7. Referring again to FIG. 8, these include a contact sensor element 806, a resistive element 804, a heater element 803, shared terminals 801, 802, voltage source 822, capacitor 823, and amplifier 821, according to one embodiment.

Figure 9:
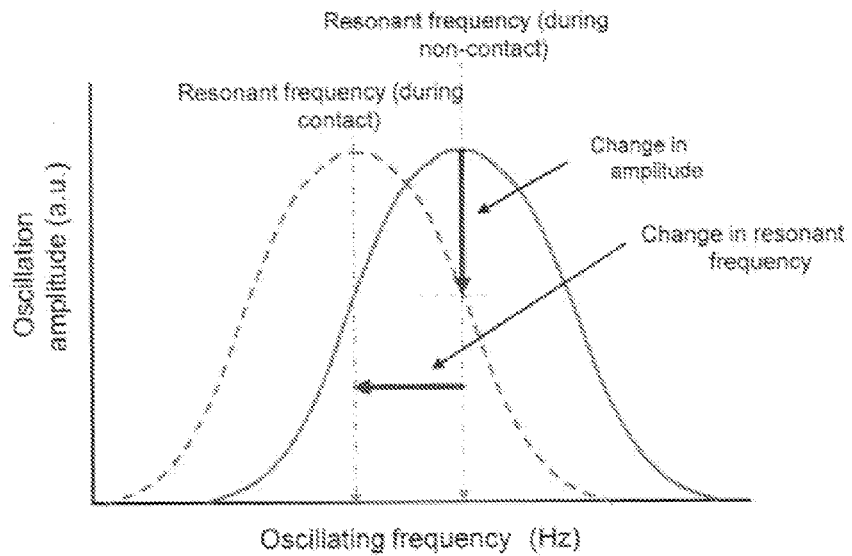
FIG. 9 is a graphical depiction of change in resonant frequency caused by contact of a sensor with a magnetic recording medium, according to one embodiment.

FIG. 9 is an example showing a method of detecting fluctuations in the resonant frequency. The graph in FIG. 9 shows the oscillating frequency on the horizontal axis and the oscillation amplitude on the vertical axis, according to one embodiment. When the resistance value of the contact sensor element is constant, the oscillation amplitude reaches a maximum value at a prescribed frequency determined according to the circuit constant. The constant resistance resonance of one embodiment of a contact sensor as described herein is shown by the solid line. If the resistance value of the contact sensor element (as shown in various embodiments in FIGS. 5-8) changes due to contact between the magnetic disk and the magnetic head, the resonant frequency fluctuates. The fluctuating resistance resonance of one embodiment of a contact sensor as described herein is shown by the dotted line in FIG. 9. There are two favored approaches to detecting such resonance. The first involves a method for capturing changes in the vibration amplitude at a prescribed frequency, and the second involves a method for capturing changes in the resonant frequency. Of course, any method may be used in conjunction with the embodiments and approaches described herein, as would be understood by one of skill in the art upon reading the present descriptions.

Figure 10:
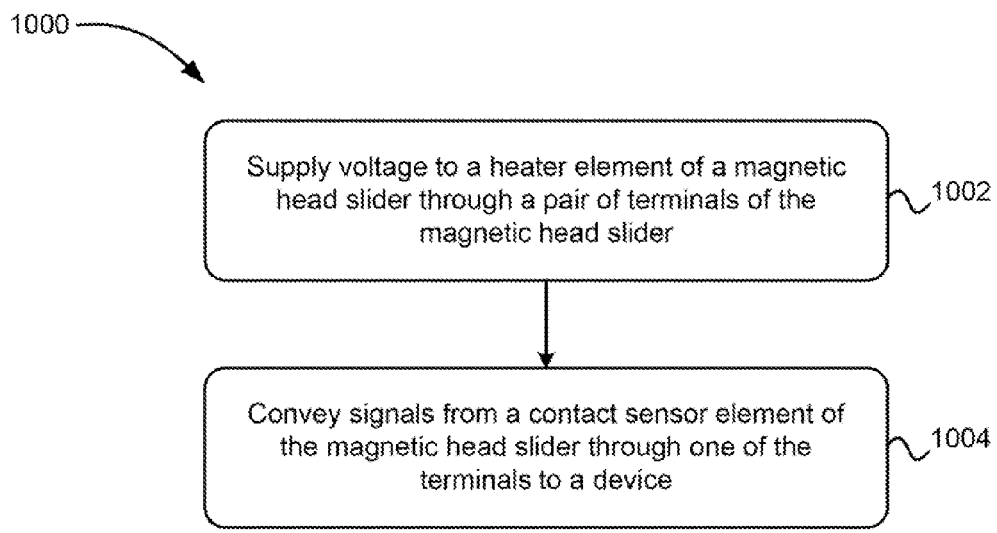
FIG. 10 is a flowchart of a method, according to one embodiment.

Now referring to FIG. 10, a method 1000 is shown according to one embodiment. The method 1000 may be carried out in any desired environment, including those shown in FIGS. 1-9, among others, as would be understood by one of skill in the art upon reading the present descriptions. Of course, more or less operations than those described in FIG. 10 may be included in the method 1000, as would be understood by one of skill in the art, according to various embodiments.

In operation 1002, according to one embodiment, voltage is supplied to a heater element of a magnetic head slider through a pair of terminals on the magnetic head slider. For example, in one embodiment shown in FIG. 5, voltage may be supplied through terminals 501 and 502 to heater element 503. Of course, this is merely one example of how operation 1002 may be performed in the embodiment depicted in FIG. 5, and operation 1002 may additionally and/or alternatively be performed in other environments, such as those represented in FIGS. 6-8, among others, as would be understood by one having ordinary skill in the art upon reading the present descriptions.

Referring again to FIG. 10, in operation 1004, according to one embodiment, signals are conveyed through one of the terminals on the magnetic head slider to a contact sensor element of the magnetic head slider. For example, in one embodiment according to the embodiment shown in FIG. 5, signals may be conveyed through terminals 501 and 502 to contact sensor element 506. Of course, this is merely one example of how operation 1004 may be performed in the embodiment depicted in FIG. 5, and operation 1004 may additionally and/or alternatively be performed in other environments, such as those represented in FIGS. 6-8, among others, as would be understood by one having ordinary skill in the art upon reading the present descriptions.

With reference again with FIG. 10, in various embodiments, the method 1000 may also include additional and/or alternative operations, some of which are described below.

In one embodiment, method 1000 may include writing data to a magnetic recording medium using a write element of the magnetic head slider and/or reading data from the magnetic recording medium using a read element of the magnetic head slider. The magnetic recording medium, in one approach, may be a magnetic disk, such as a hard disk of a hard disk drive.

In another embodiment, method 1000 may include controlling flying height (relative to a surface of the magnetic medium) of the write element and/or the read element by applying potential to a heater element of the magnetic head slider. As will be understood by the skilled artisan upon reading the present descriptions, fly-height may be controlled according to various approaches, such as thermal fly-height control (TFC), dynamic fly-height control (DFC), or any other method of controlling flying height as known in the art.

The method 1000 may also include, in other embodiments, regulating the current provided to the contact sensor element, for example by using a resistive element positioned in series with the contact sensor element. Of course, other methods of regulating current provided to the contact sensor element may additionally and/or alternatively be employed, such as by using a capacitor element, an inductor element, a current switching element, etc., as would be understood by one having ordinary skill in the art upon reading the present descriptions.

In one embodiment, method 1000 may include other steps that operatively amplify the signal from the contact sensor element and detect contact with the magnetic disk. A skilled artisan reading the present descriptions will appreciate that signal may be amplified according to any suitable approach, including inverted amplification and non-inverted amplification, and using any suitable amplification system, such as a valve amplifier, a tube amplifier, a field-emission transistor (FET) amplifier, etc., in some embodiments.

Moreover, contact with the magnetic disk may be detected according to any method, such as by monitoring and detecting changes in resistance, friction, medium rotation speed, temperature, frequency, etc., as would be understood by one having ordinary skill in the art upon reading the present descriptions.

According to the embodiments and approaches described herein, it is possible to increase the terminal area on the magnetic head slider, the connection process with the suspension, which is a support, is simplified, durability of the connection section is improved, and yield in the working process may be improved. Furthermore, the magnetic head element may be formed on a wafer of about five inches or larger using thin film processing technology. The terminals occupy a large area on the wafer, so it increases the number of head sliders possible by reducing the number of terminals present.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head slider, comprising:
   two units, each unit comprising:
      at least one magnetic head element chosen from the group consisting of: a write element configured for writing data to a magnetic recording medium and a read element configured for reading data from the magnetic recording medium;
      a heater element configured for controlling a flying height of the at least one magnetic head element above the magnetic recording medium;
      a contact sensor element configured for detecting contact between the magnetic head slider near the at least one magnetic head element and the magnetic recording medium;
      a resistive element configured for regulating current through the contact sensor element, the resistive element being positioned in series with the contact sensor element; and
      a shared terminal configured for supplying voltage to the heater element and for conveying signals from the contact sensor element; and
   a shared ground terminal coupled to the heater element and the contact sensor element of both units and configured for acting as a ground therefor,
   wherein a series combined resistance of resistances from the contact sensor element and the resistive element is about 21.5 kΩ or about 25 kΩ.

2. The magnetic head slider as recited in claim 1, wherein the signals from the contact sensor element are conveyed to a device.

3. The magnetic head slider as recited in claim 1, wherein the series combined resistance of resistances from the contact sensor element and the resistive element is about 25 kΩ.

4. The magnetic head slider as recited in claim 1, wherein two shared terminals and one shared ground terminal are present.

5. The magnetic head slider as recited in claim 1, wherein each unit further comprises terminals configured for operating the at least one magnetic head element.

6. A magnetic data storage system, comprising:
   at least one magnetic head slider as recited in claim 1;
   the magnetic recording medium;
   a drive mechanism for passing the magnetic recording medium over the at least one magnetic head slider; and
   a controller electrically coupled to the at least one magnetic head slider for controlling operation of the at least one magnetic head slider.

7. The magnetic data storage system as recited in claim 6, further comprising:
   a voltage application circuit configured for applying a voltage to the at least one magnetic head slider for providing voltage to the heater elements; and
   a contact circuit configured for amplifying a signal from the contact sensor elements of the at least one magnetic head slider and detecting contact with the magnetic recording medium, the contact circuit being coupled through a signal filter to a common terminal of the at least one magnetic head slider with the voltage application circuit.

8. The magnetic data storage system as recited in claim 7, wherein the contact circuit comprises an oscillator circuit configured for applying an alternating current (AC) signal to each of the contact sensor elements to cause resonance with the contact sensor element and detecting a change in resonant frequency or an amplitude fluctuation at a resonance point to detect contact with the magnetic recording medium.

9. The magnetic head slider as recited in claim 1, wherein the contact sensor element is positioned within the magnetic head slider in close proximity to the heater element so that a resistance value of the contact sensor element increases due to heat produced by the heater element.

10. A magnetic head slider, comprising:
   at least one magnetic head element chosen from the group consisting of: a write element configured for writing data to a magnetic recording medium and a read element configured for reading data from the magnetic recording medium;
   a plurality of heater elements, each heater element configured for controlling a flying height of one magnetic head element above the magnetic recording medium;

a plurality of contact sensor elements, each contact sensor element configured for detecting contact between the magnetic head slider near one magnetic head element and the magnetic recording medium, wherein each contact sensor element is positioned within the magnetic head slider in close proximity to a heater element so that a resistance value of the contact sensor element increases due to heat produced by the heater element;

a plurality of terminals configured for supplying voltage to the plurality of heater elements and for conveying signals from the plurality of contact sensor elements, each terminal being connected to a pair of elements: one of the plurality of heater elements and one of the plurality of contact sensor elements;

a number of ground terminals numbering half as many as the plurality of terminals, each ground terminal being coupled to one of the plurality of heater elements and one of the plurality of contact sensor elements and configured for acting as a ground therefor; and a plurality of resistive elements, each resistive element configured for regulating current to one of the plurality of contact sensor elements and positioned in series with the contact sensor element, wherein a series combined resistance of each set of contact sensor element and resistive element pairs is about 25 kΩ in order to cause about 1 mW of power to flow to the contact sensor element during operation thereof.

11. The magnetic head slider as recited in claim 10, wherein the signals from the plurality of contact sensor elements are conveyed to a device.

12. A magnetic data storage system, comprising:
at least one magnetic head slider as recited in claim 10;
the magnetic recording medium;
a drive mechanism for passing the magnetic medium over the at least one magnetic head slider; and
a controller electrically coupled to the at least one magnetic head slider for controlling operation of the at least one magnetic head slider.

13. The magnetic data storage system as recited in claim 12, further comprising:
at least one voltage application circuit configured for applying a voltage to the at least one magnetic head slider for providing voltage to the heater elements; and
at least one contact detecting circuit configured for amplifying a signal from one of the contact sensor elements of the at least one magnetic head slider and detecting contact with the magnetic recording medium, the contact detecting circuit being coupled through a signal filter to a common terminal of the at least one magnetic head slider with the voltage application circuit.

14. The magnetic data storage system as recited in claim 13, wherein the at least one contact detecting circuit comprises an oscillator circuit configured for applying an alternating current (AC) signal to the contact sensor elements to cause resonance with the contact sensor elements and detecting a change in resonant frequency or an amplitude fluctuation at a resonance point to detect contact with the magnetic recording medium.

15. A method, comprising:
supplying voltage to a first heater element of a magnetic head slider through a first terminal and a ground terminal of the magnetic head slider;
supplying voltage to a second heater element of the magnetic head slider through a second terminal and the ground terminal of the magnetic head slider;
conveying signals from a first contact sensor element of the magnetic head slider through at least one of the first terminal and the ground terminal to a device;
conveying signals from a second contact sensor element of the magnetic head slider through at least one of the second terminal and the ground terminal to the device;
regulating current provided to the first contact sensor element using a first resistive element positioned in series with the first contact sensor element; and
regulating current provided to the second contact sensor element using a second resistive element positioned in series with the second contact sensor element,
wherein a series combined resistance of resistances from the first contact sensor element and the first resistive element is about 21.5 kΩ or about 25 kΩ,
wherein the first contact sensor element and the first heater element are coupled to the first terminal,
wherein the second contact sensor element and the second heater element are coupled to the second terminal, and
wherein the first and second heater elements and the first and second contact sensor elements are coupled to the ground terminal.

16. The method as recited in claim 15, further comprising writing data to a magnetic recording medium using a write element of the magnetic head slider and reading data from the magnetic recording medium using a read element of the magnetic head slider.

17. The method as recited in claim 16, further comprising controlling a flying height of one of the write element and the read element above the magnetic recording medium by applying a voltage to a heater element of the magnetic head slider.

18. The method as recited in claim 15, wherein the current provided to the first contact sensor element is regulated to about 1 mW due to the series combined resistance of resistances from the first contact sensor element and the first resistive element being about 25 kΩ.

19. The method as recited in claim 14, further comprising:
increasing a resistance value of the first contact sensor element due to heat produced by the first heater element;
increasing a resistance value of the second contact sensor element due to heat produced by the second heater element;
amplifying a signal from at least one of the contact sensor elements; and
detecting contact with the magnetic recording medium.

20. The method as recited in claim 19, wherein contact with the magnetic recording medium is detected by applying an alternating current (AC) signal to at least one of the contact sensor elements to cause resonance with the contact sensor element and detecting a change in resonant frequency or an amplitude fluctuation at a resonance point to detect contact with the magnetic recording medium.

* * * * *

UNITED STATES PATENT AND TRADEMARK OFFICE
CERTIFICATE OF CORRECTION

| | | |
|---|---|---|
| PATENT NO. | : 8,879,189 B2 | Page 1 of 1 |
| APPLICATION NO. | : 13/358367 | |
| DATED | : November 4, 2014 | |
| INVENTOR(S) | : Miyamoto et al. | |

It is certified that error appears in the above-identified patent and that said Letters Patent is hereby corrected as shown below:

In the specification:

col. 2, line 23 replace "stricture," with -- structure, --.

Signed and Sealed this
Tenth Day of March, 2015

Michelle K. Lee
*Deputy Director of the United States Patent and Trademark Office*